(No Model.) 3 Sheets—Sheet 1.
C. S. BRADLEY.
ELECTRIC MOTOR.

No. 439,102. Patented Oct. 28, 1890.

Witnesses:—
E. C. Grigg.
R. H. Strehmel.

Charles S. Bradley
Inventor
McTighe & Worthington
Attorneys.

(No Model.)  3 Sheets—Sheet 2.
C. S. BRADLEY.
ELECTRIC MOTOR.

No. 439,102. Patented Oct. 28, 1890.

WITNESSES
Wm A. Lowe
E. C. Grigg

Charles S. Bradley  INVENTOR
McTighe & Worthington
Attorneys (No Model.) 3 Sheets—Sheet 3.

C. S. BRADLEY.
ELECTRIC MOTOR.

No. 439,102. Patented Oct. 28, 1890.

WITNESSES

Charles S. Bradley, INVENTOR

UNITED STATES PATENT OFFICE.

CHARLES S. BRADLEY, OF YONKERS, NEW YORK.

ELECTRIC MOTOR.

SPECIFICATION forming part of Letters Patent No. 439,102, dated October 28, 1890.

Application filed July 5, 1890. Serial No. 357,730. (No model.)

*To all whom it may concern:*

Be it known that I, CHARLES S. BRADLEY, a citizen of the United States, residing at Yonkers, in the county of Westchester and State of New York, have invented certain new and useful Improvements in Electric Motors; and I do hereby declare the following to be a full, clear, and exact description of the invention, such as will enable others skilled in the art to which it appertains to make and use the same.

This invention relates to electric motors of the alternating-current type, and has especial reference to motors intended for operation with the ordinary single-circuit alternating current as distinguished from what may be termed "differential-phase alternating currents." Objections have been raised to the latter owing to the requirement of two or more differential-phase currents, calling for two or more separate circuits, either locally or throughout the system of distribution.

In the present invention I use the ordinary single-circuit alternating current and have designed a motor capable of successful operation in the ordinary manner—that is to say, without the necessity of having any synchronous relation between it and the generator.

The invention consists in so organizing the field-magnet and armature that the former, at suitably-recurring intervals, will constitute in part a primary receptive circuit and attract the armature while another part will form a circuit closed on itself, become the seat of secondary currents, and repel the armature, and, further, in organizing the machine so that the above-described actions alternate with each other in the same parts, and, further, in the arrangement and combination of devices, substantially as hereinafter fully described and claimed.

As the invention is applicable to a variety of forms of machine, I do not limit myself to any particular mechanical or electrical construction further than hereinafter pointed out, as such rests with the judgment of the builder.

In the accompanying drawings, which form part of this specification, I have shown a four-pole field-magnet and a two-pole armature with a two-part commutator, as the invention can be most clearly shown and described in connection therewith.

Figure 1:
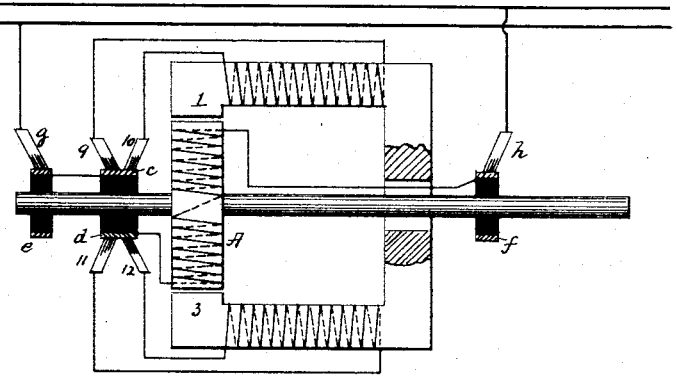
Figure 2:
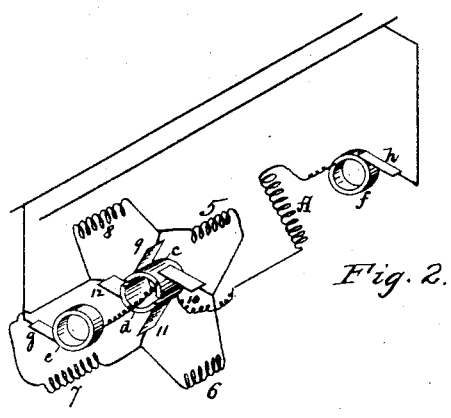
Figure 3:
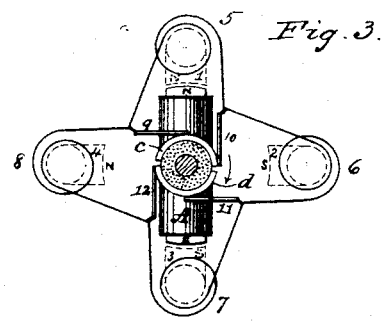
Figure 4:
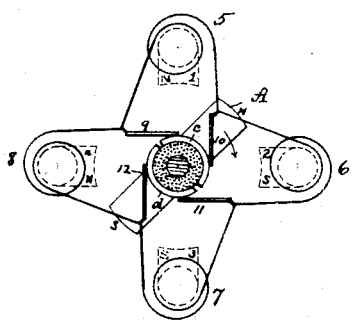
Figure 5:
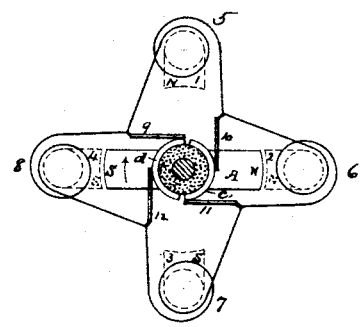
Figure 6:
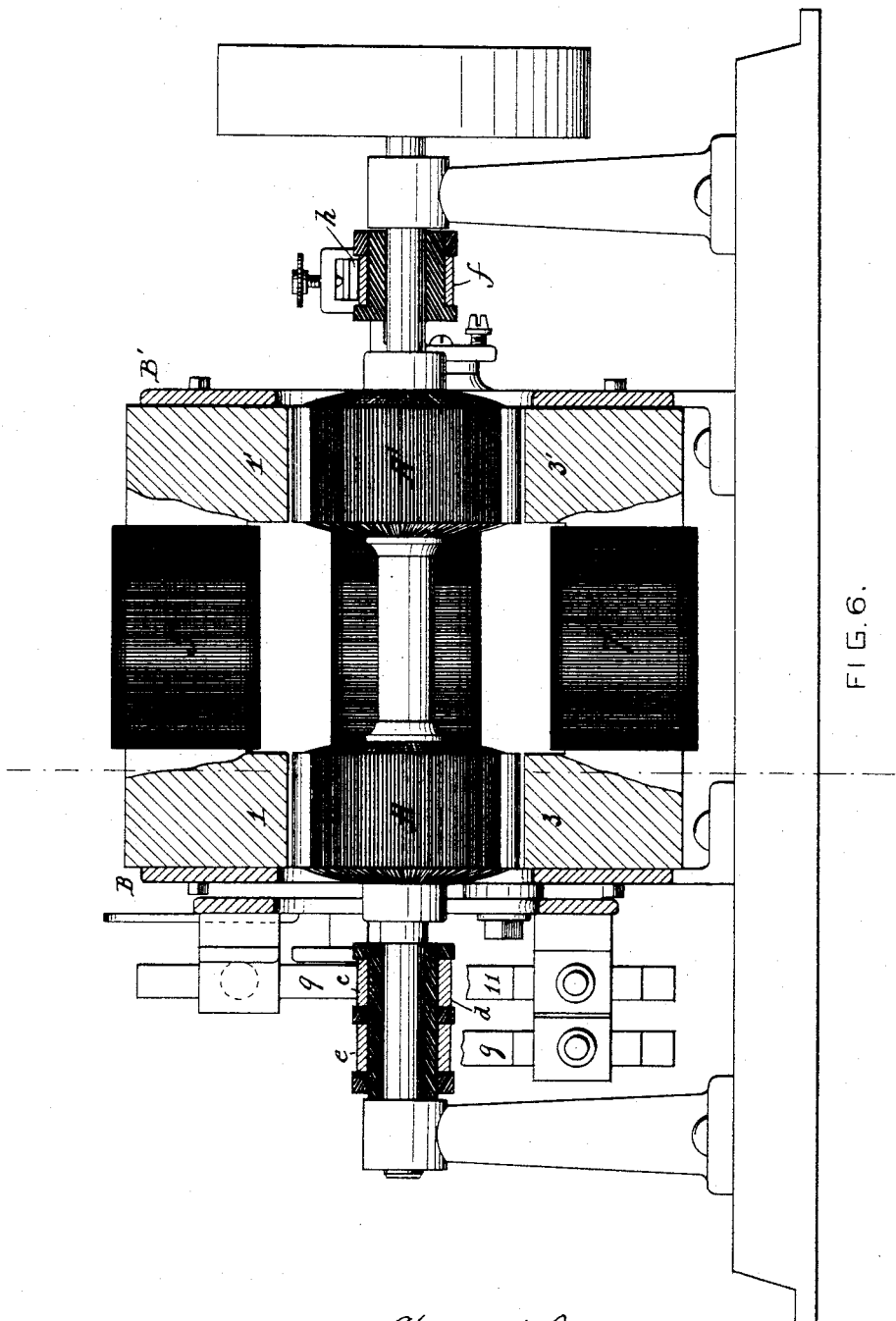

Figure 1 is a circuit diagram representing a longitudinal section of an electric motor according to my invention. Fig. 2 is a diagram illustrating the complete circuits. Figs. 3, 4, and 5 are circuit diagrams representing the motor in transverse section in three successive positions, showing one complete cycle of operation. Fig. 6 is a longitudinal section, and Fig. 7 a transeverse section of a complete machine according to my invention.

Referring now to Fig. 1, the machine may be organized conveniently by arranging an ordinary single-coil armature A on a shaft so as to rotate within the four-field magnet-poles 1, 2, 3, and 4, which are energized by the coils 5, 6, 7, and 8, respectively.

On the armature-shaft I arrange a two-part commutator having the plates $c$ $d$, each extending about half-way round, and bearing on these at points about ninety degrees apart I arrange the four brushes 9, 10, 11, and 12. On the same shaft I arrange the two contact-rings $e$ and $f$, which permit the line-current to be led through the motor, and the brushes $g$ and $h$ bearing on these may be said to constitute the line-terminal of the motor. The field-magnet coils are all wound similarly and have opposite terminals connected together in pairs to one of the brushes. Brush 9 is connected to the end of coil 8 and the beginning of coil 5, brush 10 to the end of coil 5 and beginning of coil 6, brush 11 to the end of coil 6 and beginning of coil 7, and brush 12 to the end of coil 7 and beginning of coil 8. Ring $e$ is connected by a wire with plate $c$, while plate $d$ forms one terminal of the armature A, the other end of whose circuit goes direct to the ring $f$.

Referring in turn to the diagrams, Figs. 2, 3, 4, and 5, the operation is as follows: In the position shown at Fig. 3 the field-magnet coils 6 and 8 are closed to line, while coils 5 and 7 are closed each on itself and each becomes the seat of a secondary current opposite in direction to that which would circulate were it in normal circuit, and hence the polarity induced by such secondary currents is reversed. Line-current goes from ring $e$ to plate $c$, splits at brushes 9 and 10 through coils 8 and 6, joins by brushes 11 and 12 at plate $d$, goes thence through armature A, and returns to line at brush $h$. Poles 2 and 4 now attract the respective poles of the armature, the polarities induced by the line-current being represented for the actuating current-phase by the full letters N and S. Poles 1 and 3 are also energized, but by the secondary current of opposite direction circulating in what are now closed coils 5 and 7, and consequently what would otherwise by N and S polarity are the reverse and are indicated by the dotted letters. The result is that the attraction set up by the poles 2 and 4 for the armature-poles is aided by the repulsion set up by the secondary poles 1 and 3 and motion of the armature takes place and continues irrespective of the alternations of current on the line, since these do not change the direction of attraction or repulsion. Movement of the armature continues, as shown by Fig. 4, till the commutator has changed the circuits. When plate $c$ arrives under brushes 10 and 11 and plate $d$ is under brushes 12 and 9, as shown at Fig. 5, coils 6 and 8 become the closed or secondary circuits and coils 5 and 7 are closed to line, the armature A receiving the whole current, as before, after it has passed through coils 5 and 7. Poles 1 and 3 now become the attracting-poles and 2 and 4 the repelling-poles, and the motion continues.

Figure 7:
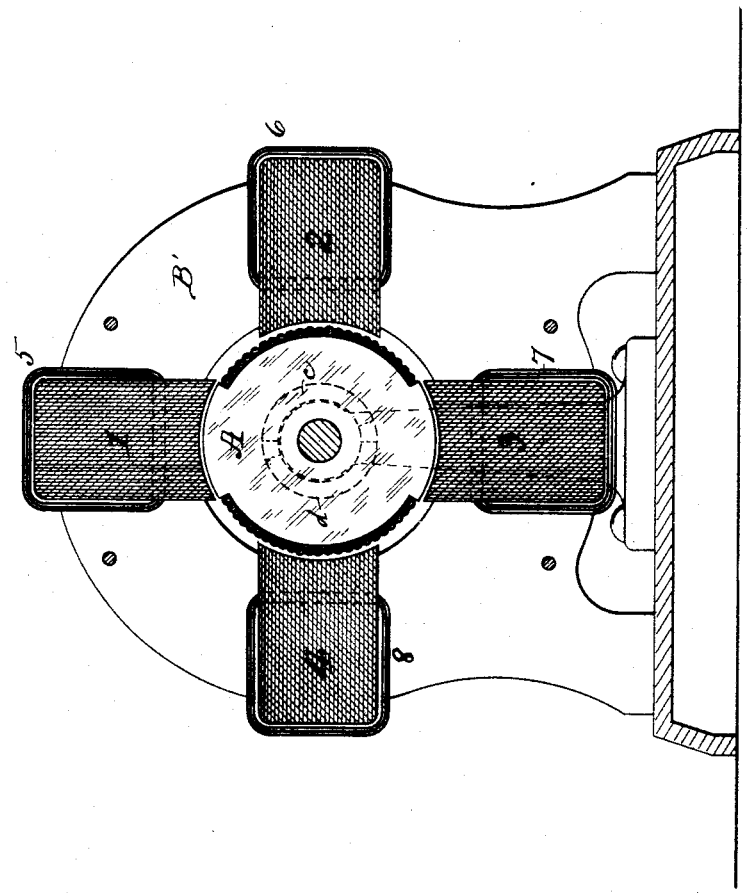

A practical form of my invention is illustrated in Figs. 6 and 7. In this case the machine is made double—that is to say, there are two armatures A and A'—and the field-magnets are composed of longitudinally-arranged bars or bunches of plates with inturned pole-pieces, and the respective energizing coils 5, 6, 7, and 8, as before, so that with respect to the pole-pieces opposite a given armature the other armature forms the yoke of the magnetic circuit.

The various parts already described are marked with the same reference letters and figures, namely: ring $e$, brush $g$, commutator $c\,d$, brushes 9, 10, 11, and 12, field-magnet coils 5, 6, 7, and 8, armature A, ring $f$, and brush $h$. The field-magnet structure is supported on the annular heads B B', which should be made of some non-magnetic material, such as brass or zinc.

I claim as my invention—

1. An electric motor for alternating currents, comprising an armature and field-magnet, the latter having its circuit alternately partly closed on itself and partly included in the line-circuit, the former or closed portion constituting a secondary circuit or circuit of self-induction and repelling the armature, while the latter constitutes a primary circuit and attracts the armature.

2. An alternating-current motor having a continuously-energized armature, a multipolar field-magnet whose circuit is closed in loops, and a commutator connected on the one hand with the line and on the other with the field and armature circuits, the relations being such that the commutator at all times sends the line-current through the armature and closes alternate field-loops on themselves, while placing the intermediate loops in series with the armature.

3. In an alternating-current electric motor, the combination of a multipolar field-magnet having its winding closed in loops, an armature, and a commutator adapted to selectively pass the operating-current through only a portion of the field-circuit.

4. An alternating-current motor having the coils of one member of its magnetic system adapted for continuous connection with the supply-circuit, the coils of the other member being progressively divided by a commutator into two sets lying on opposite sides of the poles of the first-mentioned member, and brushes for leading the alternating current to one set and connecting the other set in closed circuit upon themselves, whereby a combined attractive and repulsive effort will be continuously maintained on the rotating member of the motor.

In testimony whereof I affix my signature in presence of two witnesses.

CHARLES S. BRADLEY.

Witnesses:
T. J. McTighe,
E. C. Grigg.